(12) United States Patent
Cho et al.

(10) Patent No.: US 7,121,308 B2
(45) Date of Patent: Oct. 17, 2006

(54) FUEL SUPPLY DEVICE FOR DIRECT METHANOL FUEL CELLS

(75) Inventors: Hye-jung Cho, Anyang-si (KR); Xiao-bing Luo, Yongin-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 262 days.

(21) Appl. No.: 10/851,216

(22) Filed: May 24, 2004

(65) Prior Publication Data
US 2005/0053823 A1    Mar. 10, 2005

(30) Foreign Application Priority Data
Sep. 5, 2003    (KR)    ............ 10-2003-0062245

(51) Int. Cl.
*B65B 3/16*    (2006.01)
(52) U.S. Cl. .................. 141/114; 141/23; 141/67; 141/286; 141/366; 141/391; 429/34; 429/39
(58) Field of Classification Search ............ 141/2, 141/18, 21, 23, 67, 285, 286, 363–366, 391; 429/17, 34, 38, 39
See application file for complete search history.

(56) References Cited
U.S. PATENT DOCUMENTS
6,387,559 B1    5/2002    Koripella et al. ............ 429/34
6,458,479 B1    10/2002    Ren et al. ............ 429/33
6,497,975 B1    12/2002    Bostaph et al. ............ 429/38
6,576,360 B1 *  6/2003    Kawasumi et al. ............ 429/22
2003/0129464 A1  7/2003    Becerra et al.
2003/0148166 A1  8/2003    DeJohn et al.

FOREIGN PATENT DOCUMENTS
DE    101 36 753    2/2003
JP    55-001482    1/1980
JP    2002-000731    1/2002

* cited by examiner

*Primary Examiner*—Timothy L. Maust
(74) *Attorney, Agent, or Firm*—Lee & Morse, P.C.

(57) ABSTRACT

A fuel supply device for direct methanol fuel cells includes a fuel tank for storing liquid fuel, a cavity plate formed on the fuel tank, the cavity plate storing liquid fuel transferred from the fuel tank, and a nozzle plate formed on the cavity plate, the nozzle plate ejecting upwardly the liquid fuel stored in the cavity plate, wherein a fuel tank body of the fuel tank includes a bellows type vessel capable of contracting and expanding. Accordingly, it is possible to actively control an amount of liquid fuel supplied by the fuel supply device to a fuel cell while minimizing electric power consumption, and to effectively remove by-products, thereby improving efficiency of the fuel cell.

14 Claims, 10 Drawing Sheets

FUEL SUPPLY DEVICE FOR DIRECT METHANOL FUEL CELLS

BACKGROUND OF THE INVENTION

1. Field of the Invention

The present invention relates to a fuel supply device for direct methanol fuel cells. More particularly, the present invention relates to a fuel supply device for direct methanol fuel cells including a fuel tank having a fuel tank body that is capable of contracting and expanding, by which liquid fuel may be actively supplied in a predetermined amount to a fuel cell.

2. Description of the Related Art

Recently, as the use of notebook computers, mobile phones, PDAs, etc. increases, concern for energy sources of such portable electronic devices also increases. Energy sources of portable electronic devices should be small and should be able to continuously supply electric power even when such devices are carried for a long period of time. Conventional secondary cells, however, when recharged a single time, have a short usable period, and are further limited by a large size. In addition, conventional secondary cells are heavy, expensive, and cause pollution upon disposal. Fuel cells, in contrast, have an energy density about 3 times higher than that of secondary cells and thus, can be used for a long period of time by a single recharge. Also, fuel cells can provide a lightweight, small-sized energy source, and can be used semi-permanently by the refueling of a storing vessel. Further, fuel cells are environmentally friendly energy sources that do not cause pollution upon disposal. Therefore, fuel cells may make good energy sources for portable electronic devices.

Fuel cells are classified by electrolytes contained in the cells, including, for example, phosphoric acid fuel cells (PAFC) using phosphoric acid as an electrolyte, alkaline fuel cells using potassium hydroxide as an electrolyte, polymer electrolyte fuel cells (Proton Exchange Membrane Fuel Cell, PEMFC) using Nafion® Dow polymer as an electrolyte, molten carbonate fuel cells (MCFC) using lithium carbonate or potassium carbonate as an electrolyte, solid oxide fuel cells (SOFC) using an yttria-stabilized zirconia as an electrolyte, and direct methanol fuel cells (DMFC) using a polymer membrane as an electrolyte.

Among these, direct methanol fuel cells can directly use methanol as a fuel. Therefore, direct methanol fuel cells can be miniaturized and readily supplied with a fuel. Also, since direct methanol fuel cells have a high-density fuel output, research is under way for implementing direct methanol fuel cells as fuel cells for portable electronic devices.

As shown in FIG. 1, direct methanol fuel cells include a membrane electrode assembly, including an anode 2, a membrane 1 and a cathode 3. In the anode 2, methanol reacts with water to produce hydrogen ions and electrons. The hydrogen ions produced in the anode 2 are transferred to the cathode 3 through the electrolyte membrane 1. In the cathode 3, the hydrogen ions and electrons bind to oxygen to produce water. Such reactions are shown in the following Reaction Scheme (I).

Reaction Scheme I

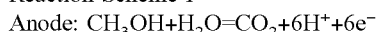
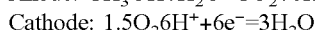
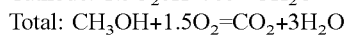

Anode: $CH_3OH + H_2O = CO_2 + 6H^+ + 6e^-$
Cathode: $1.5O_2 6H^+ + 6e^- = 3H_2O$
Total: $CH_3OH + 1.5O_2 = CO_2 + 3H_2O$ The energy generated by the chemical reaction in the fuel cell, as shown above in Reaction Scheme (I), is supplied to an electronic device as electric energy.

Since the membrane electrode assembly of the fuel cell is affected by distribution of liquid fuel, infiltration of by-products, and control of liquid flow rate, the fuel delivery strongly influences the actions of the direct methanol fuel cell in portable electronic equipment. Correspondingly, the fuel delivery, or supply, device plays a very important role in the fuel cell.

A fuel supply device transports fuel (a mixture of methanol and water) from a fuel tank to the surface of the membrane electrode assembly and removes carbon dioxide and other by-products of the used fuel on the surface of the membrane electrode assembly. The fuel supply device for direct methanol fuel cells is generally required to uniformly supply fuel, have excellent reliability, be able to readily adjust flow rate, have low power consumption and be small-sized.

Fuel supply systems known in the prior art employ a small-sized pump to transfer fuel stored in a fuel tank through a micro-channel that is in contact with an anode of a membrane electrode assembly. These fuel supply systems sufficiently supply fuel and readily control the flow rate. However, since the systems include a pump as a main component, they are limited in ability to achieve a small size. Therefore, they are difficult to utilize in small-sized direct methanol fuel cells for small electronic devices such as mobile phones or PDAs. In addition, as is known in the art, with a same Reynolds number, the flow resistance of a small or micro-sized path is greater than that of a normal or broad path. Since greater electric power is required to transfer liquid fuel through the surface of a membrane electrode assembly having a small-sized path, the fuel supply systems described above have poor efficiency for consumed electric power.

Conventional active fuel supply systems for direct methanol fuel cells are further limited by complicated manufacturing processes, which increase expenses, since the pump mechanism for the fuel supply includes a number of components. In addition, it is difficult to recharge conventional active fuel supply systems for direct methanol fuel cells without contamination when recharging a fuel tank with fuel from a fuel supply source.

In order to reduce power consumption caused by an eddy current, it has been suggested to apply a passive supply system in a direct methanol fuel cell, such as an anode assembly directly contacting a mixture of methanol and water. Such a passive fuel supply system provides low power consumption, but a flow rate of supplied fuel is hard to control in such a system.

Therefore, uncontrollable operation of a direct methanol fuel cell employing a passive fuel supply system affects electronic devices in which they are used to some extent.

Also, passive fuel supply systems have a very slow fuel flow rate and a very small power output. Accordingly, passive fuel supply systems can only address needs of battery exchange apparatuses having low power consumption.

SUMMARY OF THE INVENTION

The present invention is therefore directed to a fuel supply device for direct methanol fuel cells that can overcome the problems of the prior art by actively supplying a proper quantity of liquid fuel while consuming a minimum amount of electric power.

In an effort to provide these and other advantages, it is a feature of an embodiment of the present invention to provide a fuel supply device for direct methanol fuel cells including a fuel tank for storing liquid fuel, a cavity plate formed on the fuel tank, the cavity plate storing liquid fuel transferred from the fuel tank, and a nozzle plate formed on the cavity plate, the nozzle plate ejecting upwardly the liquid fuel stored in the cavity plate, wherein a fuel tank body of the fuel tank includes a bellows type vessel capable of contracting and expanding.

The fuel tank is preferably capable of being attached to and detached from the cavity plate.

The fuel tank body preferably includes an upper end part and a lower end part, wherein the upper end part has fuel outlets to discharge the liquid fuel upwardly by contraction of the fuel tank body. The fuel outlets are preferably disposed at both sides of the upper end part of the fuel tank body.

The fuel tank may include a substrate formed under the fuel tank body, a planar circular coil formed on the substrate, and a small-sized permanent magnet welded on the lower end part of the fuel tank body and disposed over the planar circular coil. Preferably, the fuel tank body contracts upwardly by a repulsive electromagnetic force generated between the planar circular coil and the permanent magnet.

Alternatively, the fuel tank may include a planar circular coil welded on the lower end part of the fuel tank body, and a small-sized permanent magnet welded on the upper end part of the fuel tank body. Here, the fuel tank body preferably contracts upwardly by an attractive electromagnetic force generated between the planar circular coil and the permanent magnet.

The cavity plate may include fuel inlets through which the liquid fuel transferred from the fuel tank is supplied, the fuel inlets formed at positions corresponding to fuel outlets formed in the fuel tank body, and at least one cavity to store the liquid fuel supplied from the fuel inlets. Preferably, a top of the at least one cavity is opened.

The nozzle plate may include a plurality of nozzles to transfer upwardly the fuel stored in the cavity plate, and at least one channel to discharge carbon dioxide and vapor from an upper part of the fuel supply device through a side of the nozzle plate. The plurality of nozzles is preferably formed at positions corresponding to the cavity plate. Further, the plurality of nozzles may be formed in at least one row parallel to the at least one channel. Preferably, a top and one or both ends of the at least one channel is opened.

BRIEF DESCRIPTION OF THE DRAWINGS

The above and other features and advantages of the present invention will become more apparent to those of ordinary skill in the art by describing in detail preferred embodiments thereof with reference to the attached drawings in which.

DETAILED DESCRIPTION OF THE PREFERRED EMBODIMENT

Figure 1:
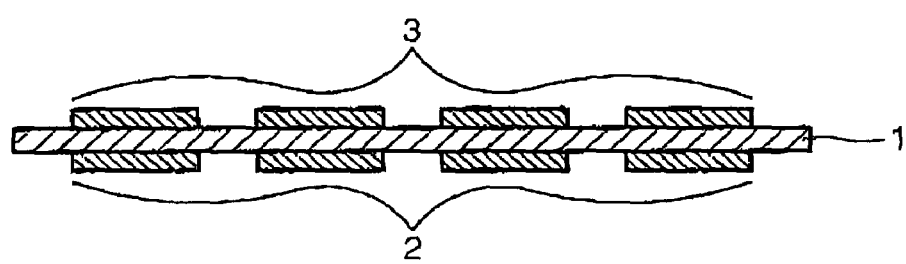
FIG. 1 illustrates a schematic view showing a membrane electrode assembly of a direct methanol fuel cell.

The present invention will now be described more fully hereinafter with reference to the accompanying drawings, in which preferred embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the thickness of layers and regions are exaggerated for clarity. Like numbers refer to like elements throughout.

Figure 2:
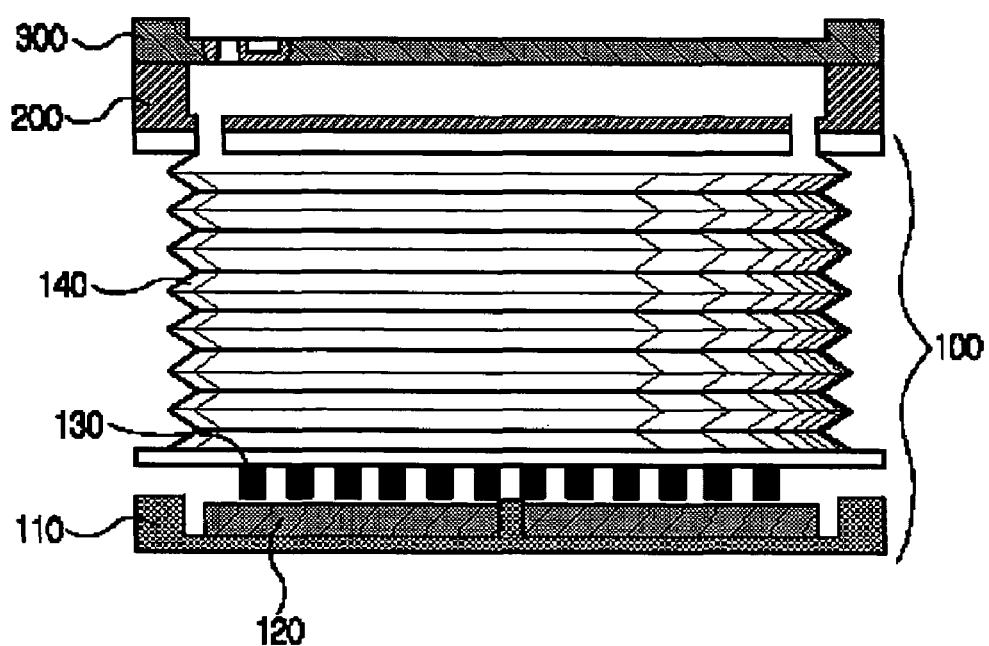
FIG. 2 illustrates a schematic view showing a fuel supply device for direct methanol fuel cells according to an embodiment of the present invention.

FIG. 2 illustrates a schematic view of a fuel supply device for direct methanol fuel cells according to an embodiment of the present invention. Referring to FIG. 2, the fuel supply device includes a fuel tank 100, having a fuel tank body 140, small-sized permanent magnets 130, a planar circular coil 120, and a substrate 110. A cavity plate 200 and a nozzle plate 300 are sequentially disposed on the fuel tank 100.

The fuel tank body 140 is a bellows type vessel for storing liquid fuel.

A bellows vessel is a vessel having a foldable structure so that the entire vessel can contract and expand by an external force. Such a bellows type vessel is mainly used to store and carry a liquid. The vessel is provided with two liquid passages at an upper end part thereof and expands as liquid is inbreathed through the two passages, which in this case are inlets. When a physical force is applied to the vessel, the vessel contracts, whereby the liquid is discharged to the outside through the passages, which in this case are outlets. The fuel tank body 140 is formed as a bellows type vessel and contracts by an external physical force.

The fuel tank body 140 may be attached to and detached from the cavity plate 200 disposed thereon. When the liquid fuel stored in the fuel tank body 140 is consumed and the fuel tank body 140 contracts, the fuel tank body 140 is detached from the cavity plate 200 and is recharged with liquid fuel from the outside. When being recharged with liquid fuel, the fuel tank body 140 expands again. When the fuel tank body 140 expands by inputting a current to the coil 120, it is recharged with liquid fuel.

Figure 3A:
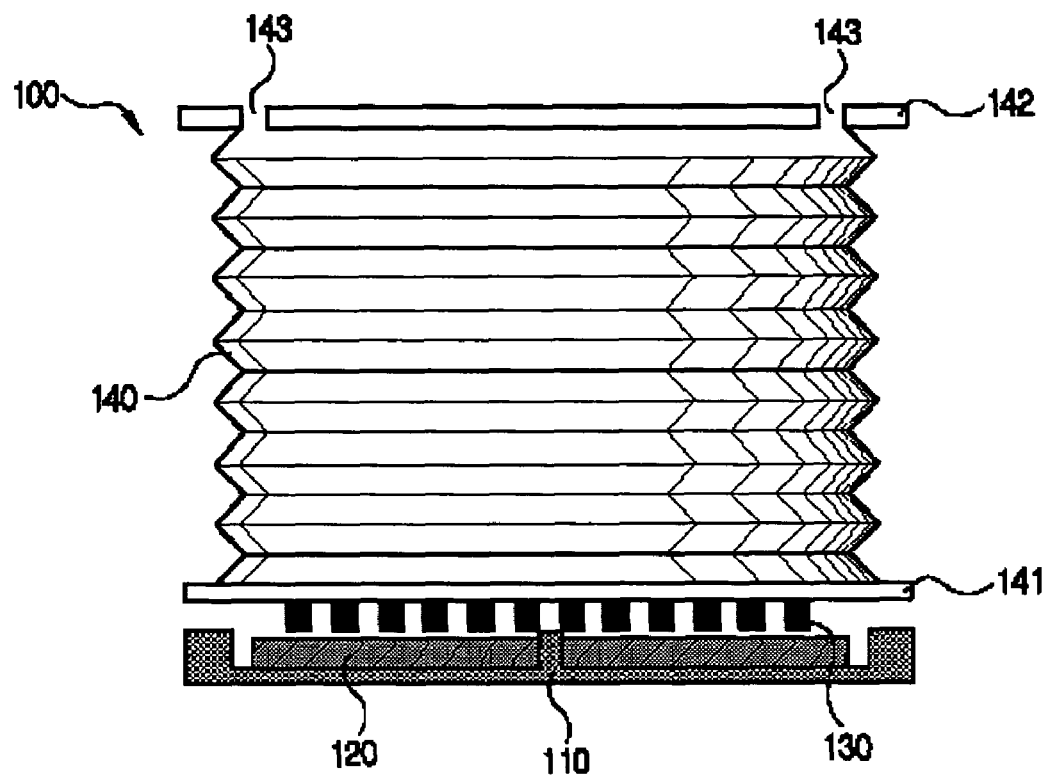
FIG. 3A and FIG. 3B illustrate cross sectional views showing a fuel tank of FIG. 2 in detail.
Figure 3B:
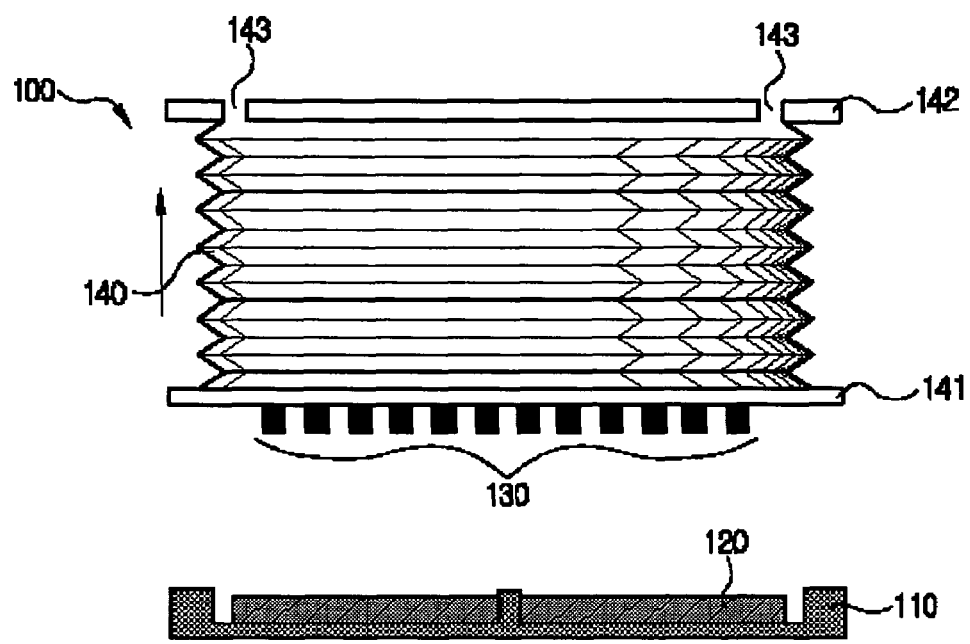

FIGS. 3A and 3B show cross sectional views of the fuel tank 100 of FIG. 2.

Referring to FIG. 3A, the fuel tank body 140 of the fuel tank 100 includes a lower end part 141 and an upper end part 142. The lower and upper end parts 141, 142 prevent a shape of the fuel tank body 140 from being distorted upon contraction and expansion by providing support to the fuel tank body 140. Also, the upper end part 142 is provided with fuel outlets 143, through which the liquid fuel in the fuel tank body 140 is discharged to the outside and serves as a connecting part when the fuel tank 100 is detached from or attached to the cavity plate 200 (FIG. 2). Further, the lower end part 141 provides a position on which the small-sized permanent magnets 130 may be welded.

The substrate 110 is formed under the fuel tank body 140 and the planar circular coil 120 is welded on a predetermined area of the substrate 110. The small-sized permanent magnets 130 are welded on the lower end part 141 of the fuel tank body 140 at positions corresponding to the planar circular coil 120.

The planar circular coil 120 is connected to an external power source (not shown) where the fuel supply device is provided. A magnetic field is generated when a current is provided to the planar circular coil 120 from the external power source. The magnetic field produces a repulsive force between the permanent magnets 130 and the circular coil 120. Since the planar circular coil 120 is welded on the substrate 110, which is fixed, the lower end part 141 of the fuel tank body 140 is pushed up by the repulsive force, causing the fuel tank body 140 to contract.

The strength of the repulsive force generated between the coil 120 and the permanent magnets 130 varies depending on an amount of the current applied to the planar circular coil 120. Therefore, the quantity of liquid fuel supplied to a fuel cell may be properly controlled by adjusting the amount of applied current. Also, since the amount of current applied to the circular coil 120 and consumed to contract the fuel tank body 140 is very small, it is possible to minimize the amount of current needed to supply fuel.

FIG. 3B shows a state in which the fuel tank body 140 of FIG. 3A is contracted by the repulsive force between the circular coil 120 and permanent magnets 130. The arrow in the drawing indicates a direction of contraction of the fuel tank body 140. As the fuel tank body 140 contracts, the liquid stored in the fuel tank body 140 is pressurized. By this pressure, the liquid fuel is supplied upwardly through the fuel outlets 143.

When all of the liquid fuel stored in the fuel tank body 140 is discharged through the fuel outlets 143, the fuel tank 100 is separated from the cavity plate 200. The fuel outlet 143 is connected to an external liquid fuel tank (not shown), and a current from an external power source (not shown) is applied to the planar circular coil 120 to generate a magnetic field. Here, the direction of the applied current is opposite the direction of the current applied when the fuel tank body 140 is contracted. As the current is applied, a magnetic field is generated in a direction opposite that of the magnetic field generated when the fuel tank body 140 is contracted. Therefore, an attractive force is generated between the circular coil 120 and permanent magnets 130 by the magnetic field. Since the upper end part 142 of the fuel tank body 140 is connected to the external liquid fuel tank, the lower end part 141 of the fuel tank body 140 moves toward the substrate when the attractive force is generated. Consequently, the fuel tank body 140 is expanded.

When the fuel tank body 140 expands, the pressure inside the fuel tank body 140 becomes lower than an external pressure, whereby the liquid fuel is drawn into the fuel tank body 140 from the external fuel tank connected to the fuel outlets 143. Here, the fuel outlets 143 serve as fuel inlets to recharge the fuel tank with the external fuel. When the fuel tank body 140 is completely expanded and the inside of the tank body is sufficiently filled with fuel, the fuel tank body 140 is again attached to the cavity plate 200 of FIG. 2 for use.

Since the contraction and expansion of the fuel tank body 140 progress very slowly, instrument fatigue does not occur. Therefore, the fuel tank body 140 may be used semi-permanently.

Figure 4:
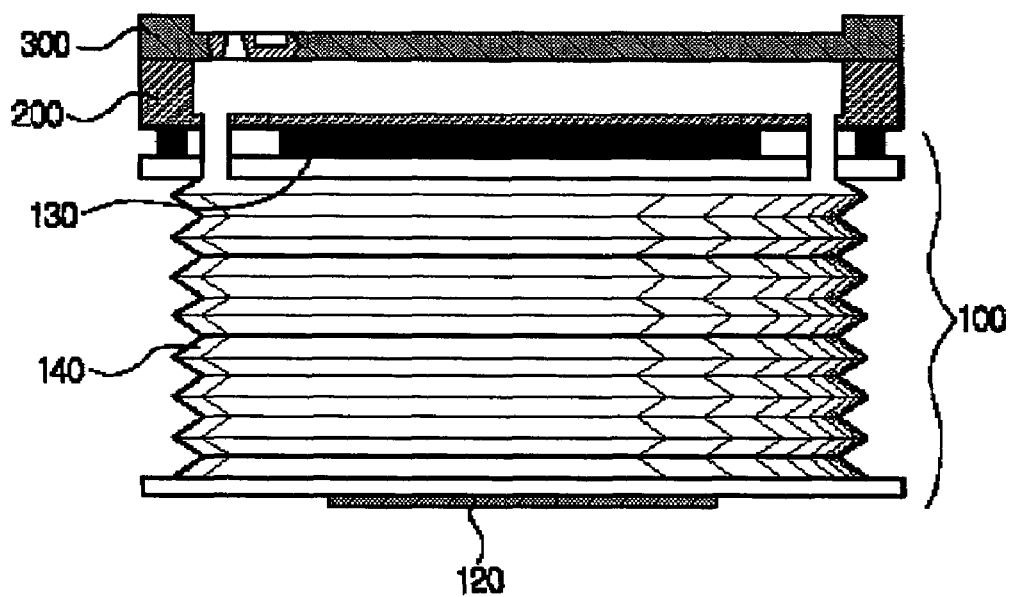
FIG. 4 illustrates a schematic view showing a fuel supply device for direct methanol fuel cells according to another embodiment of the present invention.

FIG. 4 illustrates a view of a fuel supply device according to another embodiment of the present invention.

Referring to FIG. 4, the fuel supply device includes a fuel tank 100 having a fuel tank body 140, a small-sized permanent magnet 130 and a planar circular coil 120. A cavity plate 200 and a nozzle plate 300 are sequentially disposed on the fuel tank 100.

Figure 5A:
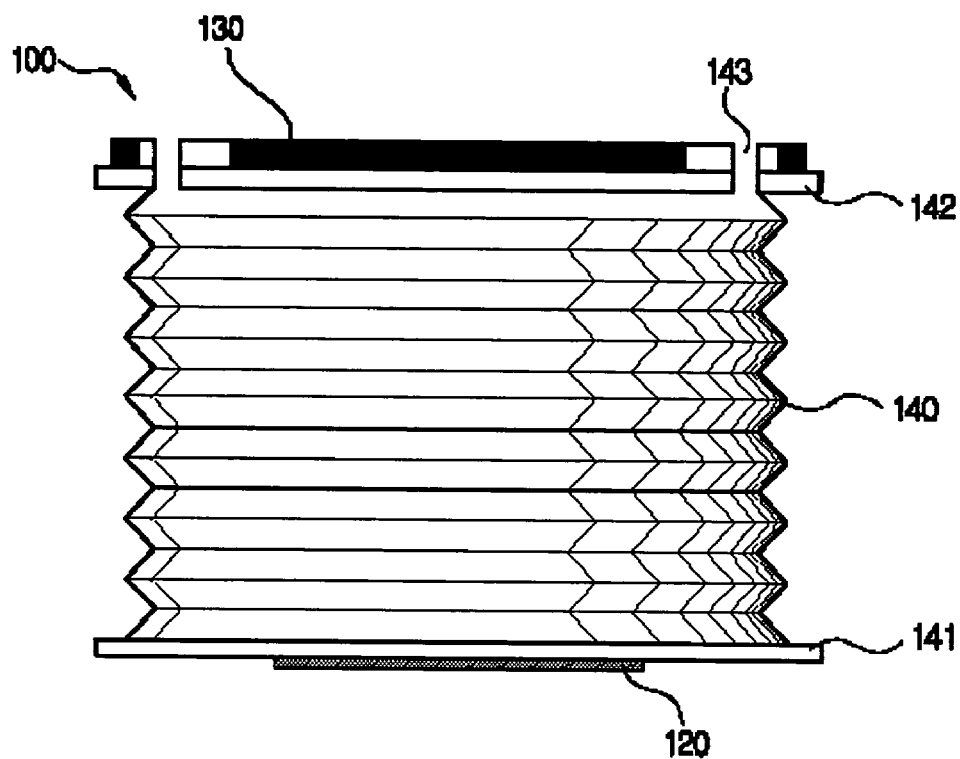
FIG. 5A and FIG. 5B illustrate cross sectional views showing a fuel tank of FIG. 4 in detail.

FIG. 5A shows a cross sectional view of the fuel tank 100 of FIG. 4 in detail. Referring to FIG. 5A, similar to the fuel tanks of FIGS. 3A and 3B, the fuel tank 100 includes a bellows type vessel as the fuel tank body 140, which has an upper end part 142 and a lower end part 141. The upper end part 142 is provided with fuel outlets 143.

However, unlike the fuel tanks of FIGS. 3A and 3B, the planar circular coil 120 of the fuel tank 100 of FIGS. 4 and 5A is welded on the lower end part 141 of the fuel tank body 140 and the small-sized permanent magnet 130 is welded on the upper end part 142 of the fuel tank body 140. In FIG. 5A, the permanent magnet 130 is formed in a single bar shape, but it is possible to use a plurality of small-sized permanent magnets as in the embodiment of FIG. 2.

The planar circular coil 120 is connected to an external power source (not shown) and is supplied with a current from the external power source. When a current flows through the coil 120, a magnetic field is generated and an produces an attractive force between the coil 120 and the permanent magnet 130. Since the upper end part 142 of the fuel tank body 140 is fixed while it is attached to the cavity plate 200 (FIG. 4), the lower end part 141 of the fuel tank is forced upwardly by the attractive force. Consequently, the bellows type fuel tank body 140 is contracted.

The strength of the attractive force generated between the coil 120 and the permanent magnet 130 varies depending on the amount of current applied to the circular coil 120. Therefore, the quantity of liquid fuel supplied to a fuel cell may be properly controlled by adjusting the amount of applied current. Also, since the amount of current applied to the circular coil 120 and consumed to contract the fuel tank body 140 is very small, it is possible to minimize the amount of current consumed to supply fuel.

Figure 5B:
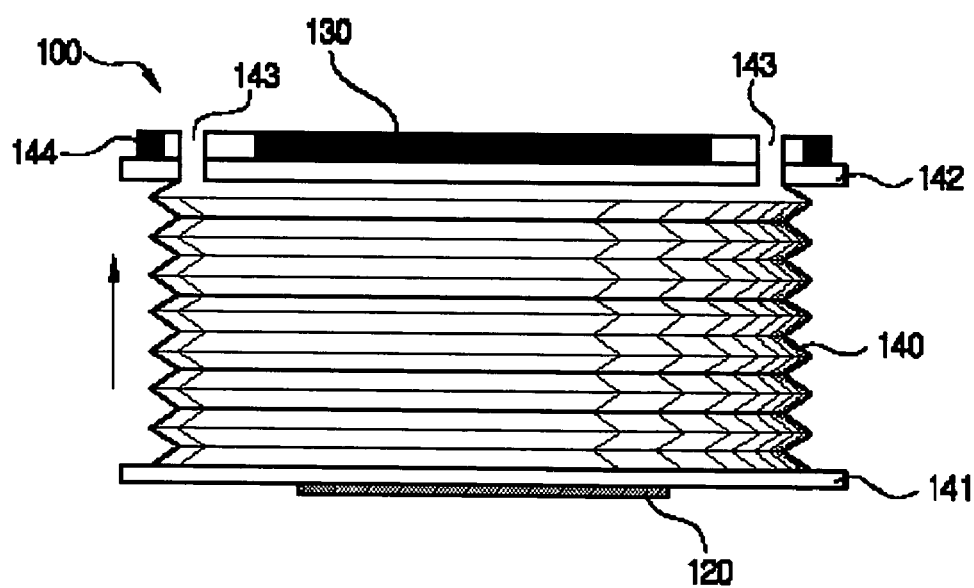

FIG. 5B shows a state in which the fuel tank body 140 of FIG. 5A is contracted. Referring to FIG. 5B, the lower end part 141 is raised by the contraction of the fuel tank body 140. The arrow in the drawing indicates a direction of contraction of the fuel tank body 140. Since the upper end part of the fuel tank body is fixed while it is attached to the cavity plate 200 of FIG. 4, it does not move. As the fuel tank body 140 is contracted, the liquid stored in the fuel tank body 140 is pressurized, whereby the liquid fuel is discharged upwardly through the fuel outlets 143.

When all of the liquid fuel stored in the fuel tank body 140 is discharged through the fuel outlets 143, the fuel tank 100 is separated from the cavity plate 200. The fuel outlets 143 are connected to an external liquid fuel tank (not shown), and a current from an external power source (not shown) is applied to the planar circular coil 120 to generate a magnetic field. Here, the direction of the applied current is opposite the direction of the current applied when the fuel tank body 140 is contracted. As the current is applied, a magnetic field is generated causing a repulsive force to be generated between the circular coil 120 and the permanent magnet 130. Since the upper end part 142 of the fuel tank body 140 is connected to the external liquid fuel tank, the lower end part 141 of the fuel tank body 140 is forced downward by the repulsive force, whereby the fuel tank body 140 is expanded.

When the fuel tank body 140 expands, the pressure inside the fuel tank body 140 becomes lower than an external pressure, and the liquid fuel is thus drawn into the fuel tank body 140 from the external fuel tank connected to the fuel outlets 143. Here, the fuel outlets 143 serve as fuel inlets to recharge the fuel tank 100 with the external fuel. When the fuel tank body 140 is completely expanded and sufficiently filled with fuel, the fuel tank body 140 is attached to the cavity plate 200 of FIG. 4 for use.

Figure 6:
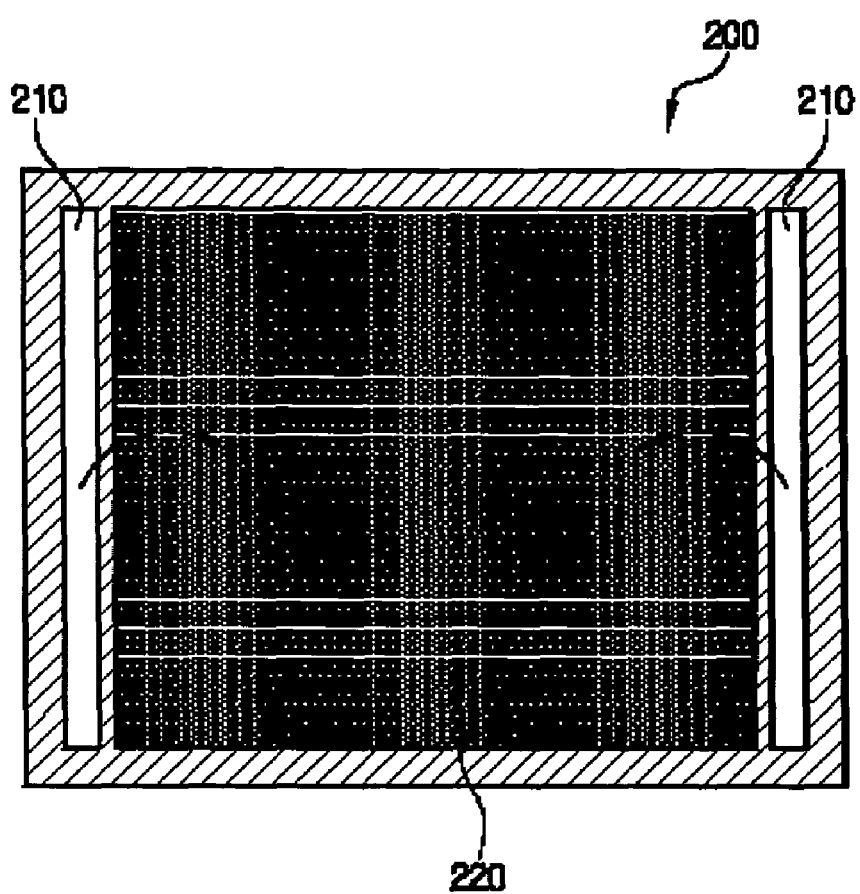
FIG. 6 illustrates a plan view of a cavity plate of FIG. 2 and FIG. 4.

FIG. 6 illustrates a plan view of the cavity plate 200 of FIGS. 2 and 4.

Referring to FIG. 6, the cavity plate 200 includes fuel inlets 210 formed at positions corresponding to the fuel outlets 143 of the fuel tank 100 of FIGS. 2 and 4 disposed below the cavity plate 200. A cavity 220 is formed at a position corresponding to a fuel cell to which the fuel supply device is provided. The arrow in the drawing refers to an inflow route of fuel.

The fuel inlets 210 are elements through which the liquid fuel discharged from the fuel outlets 143 is transferred to the cavity plate 200. Therefore, the size and position of the fuel inlets 210 correspond with those of the fuel outlets 143. The fuel inlets 210 are formed at positions corresponding to the fuel outlets 143 on both sides of the cavity plate 200, which are opposed to each other.

More than one cavity 220 may be formed in the cavity plate 200. The number of cavities 220 depends on ease of production and shape of the fuel cell to which the fuel supply device is applied. A bottom of the cavity 220 is a wall and a top of the cavity 220 is opened to form a depressed bowl shape. The liquid fuel transferred from the fuel tank 100 is stored in the cavity 220 and ejected uniformly at a predetermined rate through nozzles formed in the cavity 220.

A wall is formed between the cavity 220 and the fuel inlets 210. Alternatively, a wall between the cavity 220 and the fuel inlets 210 may be provided with micro channels (not shown) to connect the fuel inlets 210 with the cavity 220. Since such micro channels have a fine diameter, it is possible to readily transfer liquid fuel transferred through the fuel inlets 210 to the cavity 220 by capillary force and to prevent the liquid fuel from flowing backward from the cavity 220 to the fuel inlets 210.

Figure 7:
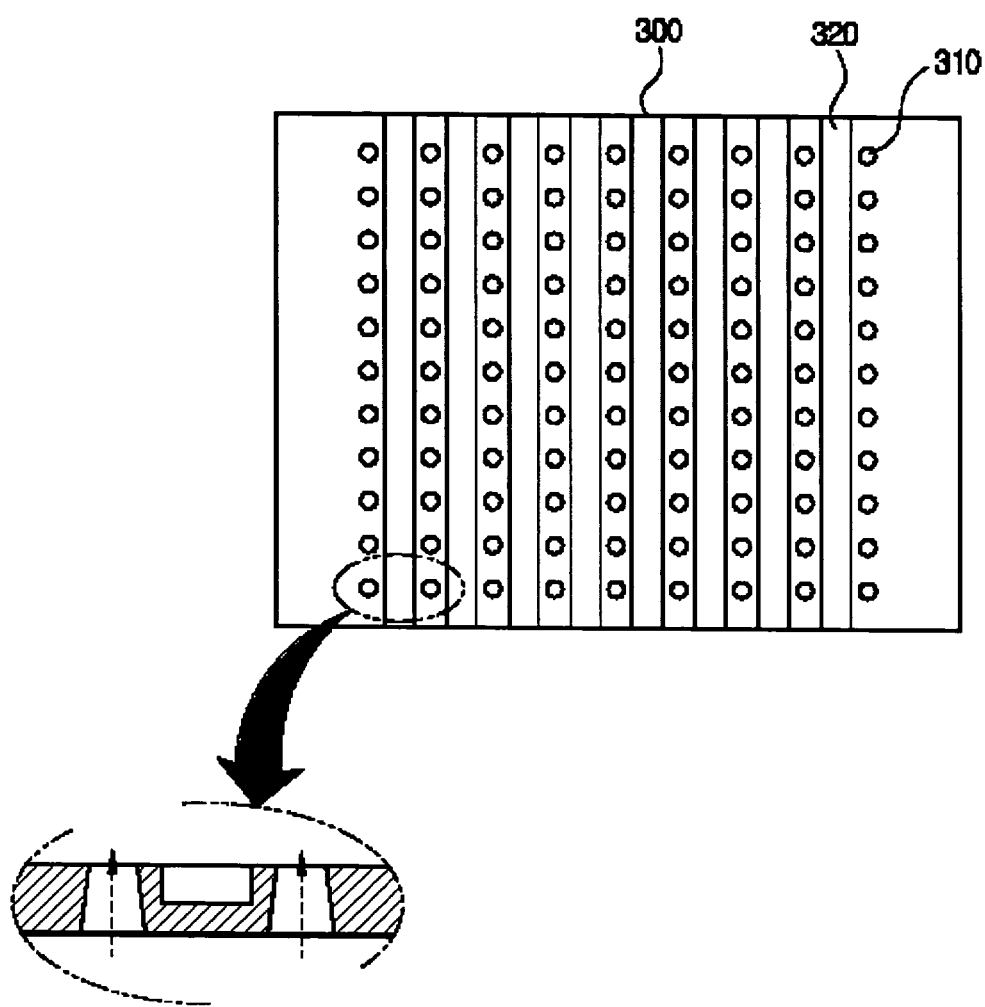
FIG. 7 illustrates a plan view of a nozzle plate of FIG. 2 and FIG. 4.

FIG. 7 illustrates a plan view of the nozzle plate 300 of FIGS. 2 and 4. Referring to FIG. 7, the nozzle plate 300 includes nozzles 310 and channels 320.

The nozzles 310 are formed in rows parallel to the fuel inlets 210 (FIG. 6) disposed below. Since the liquid fuel is ejected upwardly through the nozzles 310 from the cavity 220 (FIG. 6) below, the nozzles 310 are formed at positions corresponding to the cavity 220.

Also illustrated in FIG. 7 is a cross sectional view of an enlarged portion of the nozzles 310 and a channel 320 of the nozzle plate 300. Arrows inside the enlarged nozzles 310 indicate a direction in which fuel flows.

The rows of the nozzles 310 are formed to be parallel to each other and the channels 320 are formed to be parallel to the rows of the nozzles 310. The channels 320 are formed as grooves on the nozzle plate 300. In the embodiment of FIG. 7, each channel 320 is extended to open to both sides of the nozzle plate 300 so that by-product of the reaction from the fuel cell can be flowed there along and discharged at both sides of the nozzle plate 300. In an alternative example, the channel 320 may be extended to open to only one side of the nozzle plate 300.

A fuel supply device of the present invention is used by attaching a fuel cell to a top of the fuel supply device. Energy generated by a chemical reaction occurring in the fuel cell is supplied to an electronic device. Carbon dioxide and vapor produced as by-products of the chemical reaction are preferably removed from the fuel cell immediately after being produced. If carbon dioxide and vapor remain in the fuel cell, they inhibit the chemical reaction expected in the fuel cell, thereby deteriorating the efficiency of the fuel cell. In the embodiments of the present invention, carbon dioxide and vapor generated in the fuel cell flow into the channels 320 of the nozzle plate 300 provided under the fuel cell, and are then discharged from a side of the nozzle plate 300. Thus, the carbon dioxide and vapor generated in the fuel cell may be removed.

Figure 8:
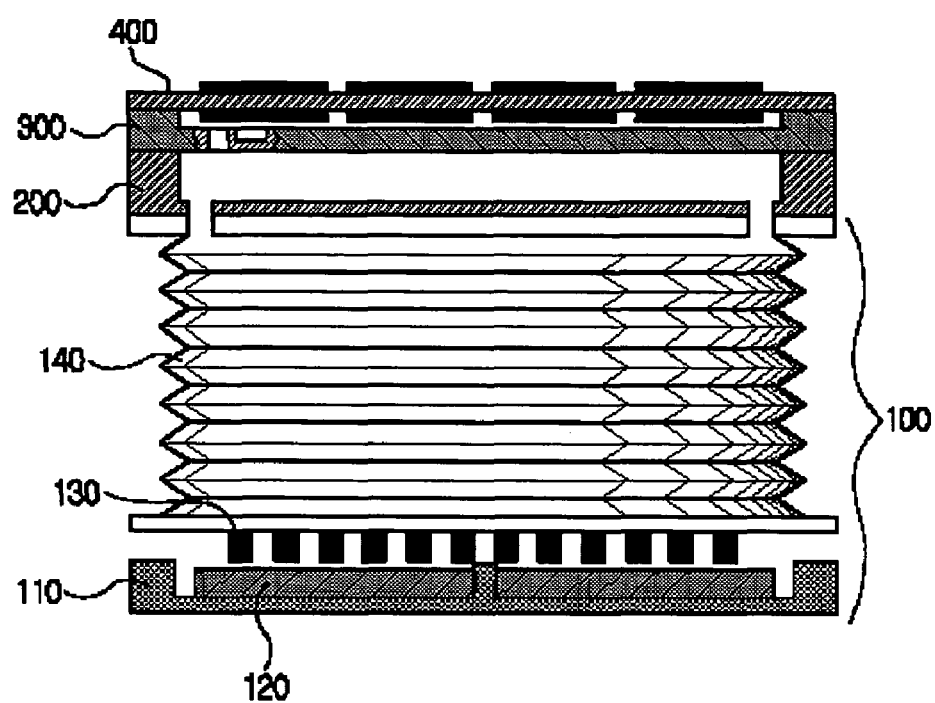
FIG. 8 illustrates a view showing the fuel supply device for direct methanol fuel cells of FIG. 2 with a fuel cell attached to the fuel supply device for direct methanol fuel cells.
Figure 9:
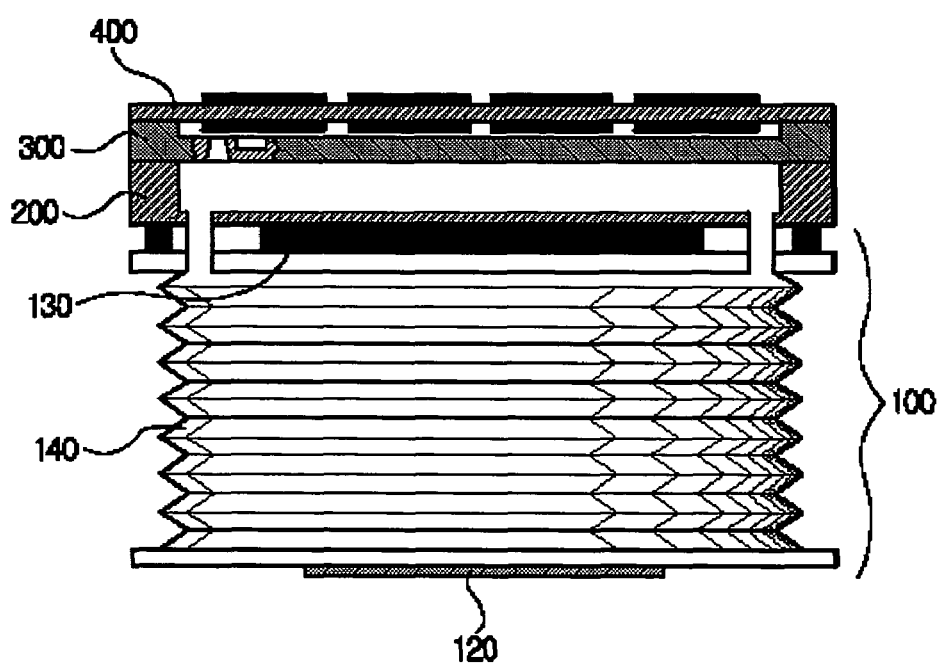
FIG. 9 illustrates a view showing the fuel supply device for direct methanol fuel cells of FIG. 4 with a fuel cell attached to an upper part of the fuel supply device for direct methanol fuel cells.

FIGS. 8 and 9 show cross sectional views of the fuel supply devices for direct methanol fuel cells of FIGS. 2 and 3, respectively, with a fuel cell attached to a top of the fuel supply devices.

Referring to FIG. 8, the fuel supply device includes a fuel tank 100, which has a cavity plate 200 and a nozzle plate 300 sequentially disposed thereon. A fuel cell 400 is disposed on the nozzle plate 300.

A fuel tank body 140 contains liquid fuel therein. When a magnetic field is generated by applying a current from an external power source (not shown) to a planar circular coil 120 formed on a substrate 110, a repulsive force is generated between the planar circular coil 120 and permanent magnets 130 welded on the lower end part (not shown) of the fuel tank body in positions corresponding to the planar circular coil 120. By this repulsive force, the fuel tank body 140 is pushed upwardly and contracted. As the fuel tank body 140 is contracted, the liquid fuel stored in the fuel tank body 140 is pressurized, whereby the liquid fuel is discharged upwardly through a fuel outlet (not shown). The strength of the repulsive force generated by the magnetic field varies depending on the amount of current applied to the circular coil 120. Therefore, the rate of the liquid fuel discharged through the fuel outlet may be properly controlled by adjusting the amount of applied current.

The liquid fuel discharged from the fuel outlet is transferred through a fuel inlet (not shown) to the cavity plate 200 and stored in a cavity (not shown) of the cavity plate 200. As the fuel continuously flows in, the liquid fuel stored in the cavity is supplied to a fuel cell 400 formed on the nozzle plate 300 through nozzles (not shown) in the nozzle plate 300.

By a chemical reaction occurring in the fuel cell 400, carbon dioxide and vapor are generated. The carbon dioxide and vapor are transferred to the nozzle plate 300 formed under the fuel cell 400 and discharged to the outside through channels (not shown) of the nozzle plate 300.

Referring to FIG. 9, the fuel supply device includes a fuel tank 100, which has a cavity plate 200 and a nozzle plate 300 sequentially disposed thereon. A fuel cell 400 is disposed on the nozzle plate 300.

A fuel tank body 140 contains liquid fuel therein. When a magnetic field is generated by applying a current from an external power source (not shown) to a planar circular coil 120 welded on a lower end part (not shown) of the fuel tank body, an attractive force is generated between the planar circular coil 120 and a permanent magnet 130 welded on an upper end part (not shown) of the fuel tank body, in a position corresponding to the planar circular coil 120. By this attractive force, the fuel tank body 140 is pulled upwardly and contracted. As the fuel tank body 140 is contracted, the liquid fuel stored in the fuel tank body 140 is pressurized, whereby the liquid fuel is discharged upwardly through a fuel outlet (not shown). The strength of the attractive force by the magnetic field varies depending on the amount of current applied on the circular coil 120.

Therefore, the rate of the liquid fuel discharged through the fuel outlet may be properly controlled by adjusting the amount of applied current.

The liquid fuel discharged from the fuel outlet is transferred through a fuel inlet (not shown) to the cavity plate 200 and stored in a cavity (not shown) of the cavity plate 200. As the fuel continuously flows in, the liquid fuel stored in the cavity is supplied to a fuel cell 400 formed on the nozzle plate 300 through nozzles (not shown) in the nozzle plate 300.

By a chemical reaction occurring in the fuel cell 400, carbon dioxide and vapor are generated. The carbon dioxide and vapor are transferred to the nozzle plate 300 formed under the fuel cell 400 and discharged to the outside through channels (not shown) of the nozzle plate 300.

Thus, it is possible to continuously supply the liquid fuel at a uniform rate, to improve the efficiency of the fuel cell and to facilitate the recharge of the liquid fuel by immediately removing by-products generated in the fuel cell.

According to the present invention as described above, by employing a bellows type fuel tank including a circular coil and a permanent magnet, it is possible to effectively provide a fuel supply device for direct methanol fuel cells capable of actively controlling and supplying liquid fuel in a predetermined amount to a fuel cell through contraction of the fuel tank body by a repulsive or attractive electromagnetic force while consuming minimal electric power. Also, according to the present invention, by using a nozzle plate with channels, it is possible to effectively remove by-products generated in the fuel cell, thereby improving the efficiency of the fuel cell.

Preferred embodiments of the present invention have been disclosed herein and, although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A fuel supply device for direct methanol fuel cells, comprising:
   a fuel tank for storing liquid fuel;
   a cavity plate formed on the fuel tank, the cavity plate storing liquid fuel transferred from the fuel tank; and
   a nozzle plate formed on the cavity plate, the nozzle plate ejecting upwardly the liquid fuel stored in the cavity plate,
   wherein a fuel tank body of the fuel tank includes a bellows type vessel capable of contracting and expanding.

2. The fuel supply device as claimed in claim 1, wherein the fuel tank is capable of being attached to and detached from the cavity plate.

3. The fuel supply device as claimed in claim 1, wherein the fuel tank body comprises an upper end part and a lower end part, the upper end part having fuel outlets to discharge the liquid fuel upwardly by contraction of the fuel tank body.

4. The fuel supply device as claimed in claim 3, wherein the fuel outlets are disposed on both sides of the upper end part of the fuel tank body.

5. The fuel supply device as claimed in claim 3, wherein the fuel tank comprises:
   a substrate formed under the fuel tank body;
   a planar circular coil formed on the substrate; and
   a small-sized permanent magnet welded on the lower end part of the fuel tank body and disposed over the planar circular coil.

6. The fuel supply device as claimed in claim 5, wherein the fuel tank body contracts upwardly by a repulsive electromagnetic force generated between the circular coil and the permanent magnet.

7. The fuel supply device as claimed in claim 3, wherein the fuel tank comprises:
   a planar circular coil welded on the lower end part of the fuel tank body; and
   a small-sized permanent magnet welded on the upper end part of the fuel tank body.

8. The fuel supply device as claimed in claim 7, wherein the fuel tank body contracts upwardly by an attractive electromagnetic force generated between the circular coil and the permanent magnet.

9. The fuel supply device as claimed in claim 1, wherein the cavity plate comprises:
   fuel inlets through which the liquid fuel transferred from the fuel tank is supplied, the fuel inlets formed at positions corresponding to fuel outlets formed in the fuel tank body; and
   at least one cavity to store the liquid fuel supplied from the fuel inlets.

10. The fuel supply device as claimed in claim 9, wherein a top of the at least one cavity is opened.

11. The fuel supply device as claimed in claim 1, wherein the nozzle plate comprises:
   a plurality of nozzles to transfer upwardly the fuel stored in the cavity plate; and
   at least one channel to discharge carbon dioxide and vapor from an upper part of the fuel supply device through a side of the nozzle plate.

12. The fuel supply device as claimed in claim 11, wherein the plurality of nozzles is formed at positions corresponding to the cavity plate.

13. The fuel supply device as claimed in claim 11, wherein the plurality of nozzles is formed in at least one row parallel to the at least one channel.

14. The fuel supply device as claimed in claim 11, wherein a top and one or both ends of the at least one channel is opened.

* * * * *